United States Patent [19]

Baker

[11] Patent Number: 4,938,615
[45] Date of Patent: Jul. 3, 1990

[54] ROLL NECK BEARING

[75] Inventor: Mark E. Baker, Stark County, Ohio

[73] Assignee: The Timken Company, Canton, Ohio

[21] Appl. No.: 427,176

[22] Filed: Oct. 26, 1989

[51] Int. Cl.$^5$ .................... F16C 33/36; F16C 43/04
[52] U.S. Cl. .................................. 384/571; 29/895.2; 384/556
[58] Field of Search .............. 384/556, 557, 563, 571, 384/574; 29/110, 148.4 A, 148.4 D

[56] References Cited

U.S. PATENT DOCUMENTS

| | | |
|---|---|---|
| 647,270 | 4/1900 | Lindgren . |
| 1,208,428 | 12/1916 | Whitney . |
| 1,984,718 | 12/1934 | Wistrand . |
| 2,037,206 | 4/1936 | Boden . |
| 2,130,258 | 9/1938 | Baker et al. .................. 384/571 |
| 4,235,485 | 11/1980 | Reiter . |
| 4,341,426 | 7/1982 | Clapp . |

*Primary Examiner*—Thomas R. Hannon
*Attorney, Agent, or Firm*—Gravely, Lieder & Woodruff

[57] ABSTRACT

A mill roll is supported at its roll necks on tapered roller bearings, each having several cones and corresponding cups and rows of tapered rollers between the raceways of each cone and cup. Each bearing also has rib rings located at the ends of its cups to provide surfaces against which the large diameter ends of the rollers in its several sets bear. The cups and rib rings are clamped together within a chock, and they, in turn, capture the several rows of rollers. The cone raceways taper downwardly away from the roll body and lie within a single conical envelope having its center along the axis of rotation for the bearing. This arrangement allows the chock, which carries the cups, rib rings and rollers, to be passed over the cones on the roll neck. The roll body is ground while the roll is supported on the bearings that are within the chocks and with the bearings in a condition of preload. This eliminates practically all eccentricity, so runout is maintained at a minimum. The bearings B are also maintained under preload during mill operation.

20 Claims, 7 Drawing Sheets

ROLL NECK BEARING

BACKGROUND OF THE INVENTION

This invention relates in general to antifriction bearings and, more particularly, to a precision bearing assembly and a method of assembling the same to achieve minimum runout in the bearing-supported component.

In certain machinery, rotating shafts must run true, that is to say they should have as little runout as possible. Runout, of course, represents the deviation of a circular or cylindrical surface from a fixed reference point as it rotates, and could perhaps best be characterized simply as wobble. Several factors contribute to runout, and these fall into generally two categories, namely tolerances that cause bearing inner races to be slightly eccentric, when ideally they should be concentric, and radial play in the bearings which support the rotating part. The interrelationship between these two factors contribute significantly to the shaft's overall runout. Other less significant factors such as roller size irregularities also contribute to the shaft's runout.

Typical of machinery where runout must be held to an absolute minimum are the spindles of machine tools, such as lathes and milling machines, and the rolls of rolling mills. Indeed, in a rolling mill, any runout in the exterior surface of a work roll or back-up roll will detract from the quality of the sheet or other product which is produced in that mill, even when this variance may be barely perceptible.

Two types of bearings find widespread use in such machinery, those being the tapered roller bearing and the cylindrical roller bearing, for each is capable of carrying heavy radial loads. Tapered roller bearings lend themselves to adjustment in that the axial positions of the races relative to each other control the radial clearance or play and may even eliminate the radial clearance altogether. This in turn provides control of the size of the load zone, that is the number of rollers which are actually under load at any instant. Notwithstanding this capability, tapered roller bearings when used to transmit extremely heavy loads, such as in rolling mills, are usually manufactured with their tapered rollers arranged in four rows and with the tapers of adjacent rows oriented oppositely. This makes adjustments in the field difficult, and for all practical purposes these multirow bearings are adjusted at the factory through the selection of spacers. There the bearings are usually set with a slight amount of axial clearance. However, the profile of the raceway on the cone or inner race is not perfectly circular nor is its axis perfectly coincident with the axis of rotation. These imperfections cause runout. Cylindrical roller bearings, on the other hand, cannot be adjusted, and since some radial clearance must exist between the rollers and the raceways in order to assemble the bearings, cylindrical roller bearings inherently will have runout, given that the inner race cannot be ground perfectly round.

Despite the inherent runout, the cylindrical roller bearing for mill rolls affords easier control over the runout derived from manufacturing tolerances, for the raceway of the inner race, once that race is installed on the roll neck, may be ground reasonably true with respect to the axis of the roll. Typically, the roll, with the inner races of its bearings in place, is placed between centers with the roll neck later supported on steady rests. The grinding eliminates much of the runout caused by manufacturing tolerances in the roll neck and race and the expansion tolerance of the press fit, although a little runout will remain due primarily to imperfections in the grinding operation itself, for the inner race may have one or more lobes in its profile after grinding. This alternative has not been available for tapered roller bearings, primarily because their races are at different inclinations, and the inner races or cones have ribs, all of which interfere with the grinding. Furthermore, alteration of a radial dimension on a tapered raceway affects axial dimensions in the bearing and requires spacers or shims to compensate for the change in the axial dimension.

DESCRIPTION OF THE DRAWINGS

In the accompanying drawings which form part of the specification and wherein like numerals and letters refer to like parts wherever they occur

DETAILED DESCRIPTION

Figure 2:
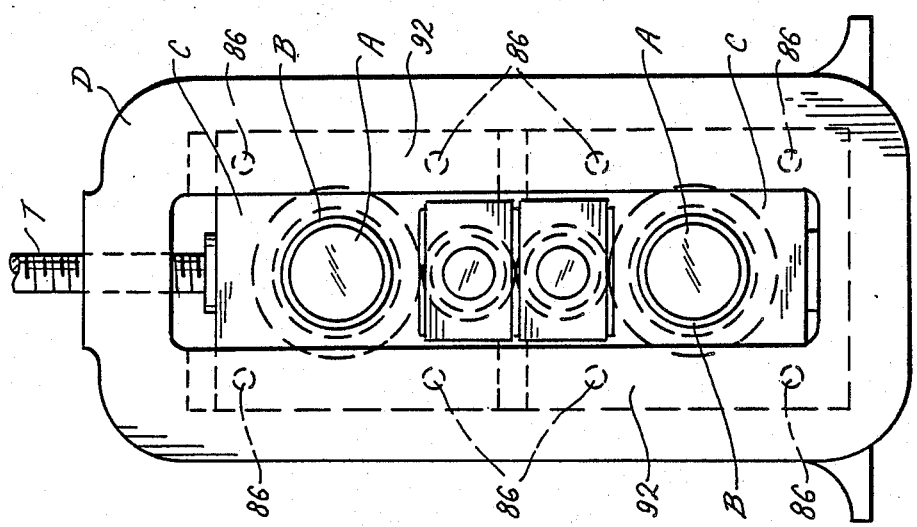
FIG. 2 is an end elevational view of the mill stand.

Referring now to the drawings, a mill stand (FIGS. 1 & 2) has rolls A, each of which at its ends rotates in a bearing B which in turn is confined within a chock C that fits into a heavy cast iron end frame D mounted securely on a foundation. Actually, the roll A is one of at least two rolls and possibly four, for the typical four-high mill stand has two work rolls between which the metal to be worked passes and in addition a pair of back-up rolls which are larger than the work rolls and prevent the work rolls from deflecting under the spreading force of the metal that is worked by them. As in any mill stand, the chocks C slide relative to the end frames D in which they are located, but are normally held together by large turn down screws T which thread into the frame D and bear against the chocks C for the upper back-up roll A. Hydraulic pressure pistons controlled through a feedback loop may be used to position the chocks C in lieu of the turn down screws T, and are actually more commonly used in today's mill designs.

The bearing B may be used to support either a work roll or back-up roll or both, although the latter is perhaps the primary application. It classifies as a tapered roller bearing and as such is capable of taking thrust loads as well as the heavy radial loads imparted by the metal which is worked. Being one of a pair of tapered roller bearings, the bearing B may also be adjusted between conditions of end play and preload. In the former a radial clearance exists in the bearing B which detracts from the stability of the roll A, and thus contributes to runout in the roll A. When in preload, the load zone may extend a full 360° within the bearing B, and the axis of the roll A is stabilized. Runout is further reduced by grinding the working surfaces of the roll A off of the preloaded bearings B. Indeed, adjusting to preload heretofore has effectively served as a procedure for reducing runout in the spindles of precision machine tools.

The roll A turns in the bearings B (FIG. 3) about an axis x of rotation which ideally is coincident to its own center axis. The roll A includes a roll body 2, which may be cylindrical, and a roll neck 4 at each end of the body 2. Each roll neck 4 has a fillet 6 where it merges into the body 2 and beyond the fillet 6 a tapered surface 8 on which the bearing B is seated. At the end of the tapered surface 8 are two cylindrical surfaces 10 and 12 of lesser diameter, the latter of which contains an annular groove 14.

Encircling the fillet 6 is a fillet ring 16 (FIG. 3) having an outwardly directed sealing surface of cylindrical configuration. At the other end of the tapered surface 8, a cone thrust ring 18 encircles the cylindrical surface 10, and the ring 18 likewise has an outwardly presented sealing surface. Indeed, the bearing B, which is around the tapered surface 8, is captured between the fillet ring 16 and the cone thrust ring 18. The groove 14 that opens out of the surface 12 contains a circular split ring 20 which serves as a backing for a retaining ring 22 that fits between it and the cone thrust ring 18 and as such encircles the surface 12. The retaining ring 22 is provided with a nut 24 which threads axially against the thrust ring 18 so that the retaining ring 22 and nut 24 fully occupy the space between the split ring 20 and the thrust ring 18 and thus provide a solid backing for the latter. The rings 16, 18 and 22 as well as the nut 24 are all conventional.

The bearing B, which encircles the roll neck 4 at the tapered surface 8, has four sections 30 (FIG. 3), each of which is in essence a single row tapered roller bearing that is mounted in the direct configuration, that is with the small diameter ends of its components presented toward the free end of the roll neck 4. Like any single row tapered roller bearing, each section 30 includes a cone 32 (FIG. 4), a cup 34 surrounding the cone 32, so that an annular space exists between the two, and tapered rollers 36 arranged in a single row or set in the annular space between the cone 32 and the cup 34. In addition, each bearing section 30 has a rib ring 38 located at the end of its cup 34, indeed at the end at which the large ends of the tapered rollers 36 are located so as to maintain the rollers 36 in the annular space between cup 32 and cone 34. Finally, each section 30 has a cage 39 which maintains the proper circumferential spacing between the rollers 36.

The cone 32 in essence is a tapered sleeve having a tapered bore 40 (FIG. 4) and an outwardly presented raceway 42 which is likewise tapered. The surface of the bore 40 and the raceway 42 extend to the ends of the cone 32 where the cone 32 has end faces, namely a back face 44 and a front face 46. The cup 34 has an inwardly presented tapered raceway 48 (FIG. 4) and an outwardly presented cylindrical surface 50, as well as a back face 52 and a front face 54.

The rib ring 38 for the bearing section 30 fits snugly against the back face 52 of the cup 34 (FIG. 4) where it is clamped between that back face 52 and the front face 54 of the preceding cup 34, if there is one. Moreover, the rib ring 38 projects radially inwardly beyond the large end of the cup raceway 48 where it is provided with a major rib 56 that is directed axially, ending at an annular surface against which the large diameter ends of the rollers 36 bear. The rib ring 38 for each section 30, except the largest, that is the one closest to the roll body 2, also has a minor rib 58 which is directed axially along the cup raceway 48 of the next section 30. The spacing between the major rib 56 at the large end of the cup raceway 48 and the minor rib 58 at the small end of the raceway 48, that rib being on the adjacent rib ring 38, is slightly greater than the length of the rollers 36. Each rib ring 38, further, has several radially directed holes 60 arranged at equal intervals around it, and each hole 60 extends from the outer surface of the rib ring 38 to the inner surface out of which it opens. The holes 60 deliver a fluent lubricant to the roller 36 of the section 30.

When the roll A revolves, the rollers 36 for each section 30 move along the tapered raceways 42 and 48 of the cone 32 and cup 34 for that section with their large end faces against the face on the major rib 56 of the rib ring 38 for that section. The radial load imposed by the roll A is of course transmitted through the rollers 36 to the chock C, and by reason of the tapers in the raceways 42 and 48, this radial load translates into a relatively small axial force directed toward the large ends of the two raceways 42 and 48, and that force would expel the rollers 36 from the annular space between the two raceways 42 and 48, were it not for the rib ring 38. Indeed, the major rib 56 of the rib ring 38 resists this axially directed expulsion force and thereby maintains the tapered rollers 36 in the correct axial position between the raceways 42 and 48. The rollers 36 are on apex, meaning that the conical surfaces represented by the two raceways 42 and 48, would, if extended to their respective apexes, have those apexes located at a common point along the axis x of the bearing B. This produces pure rolling contact between the tapered side faces of the rollers 36 and the raceways 42 and 48 along which they roll, although sliding contact exists between the end faces of the rollers 36 and the major ribs 56.

Each roller 36 further has a small bore 62 (FIG. 4) which extends completely through it on its axis. The cage 39 includes end rings 64 which extend along the large and small end faces of the rollers 36 and pins 66 which pass through the bores 62 in the rollers 36. As such, the pins 66 restrain the rollers 36 circumferentially and thus enable the cage 39 to maintain the proper spacing between the rollers 36.

Figure 3:
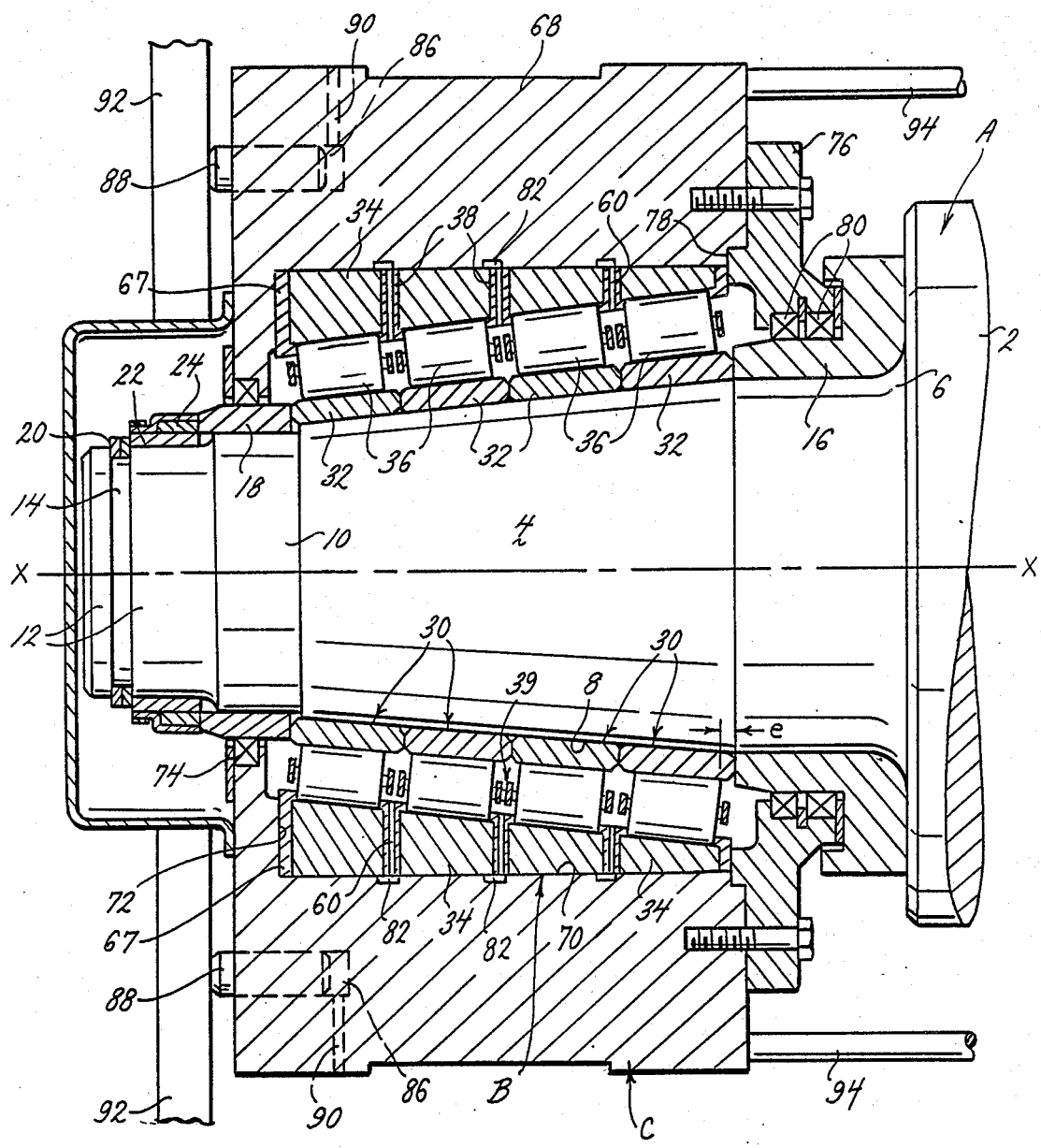
FIG. 3 is a sectional view of one of the roll neck bearings and the chock in which it is mounted and showing the roll neck in the bearing.
Figure 4:
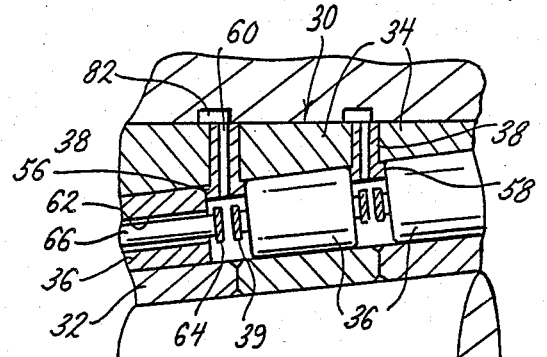
FIG. 4 is an enlarged fragmentary view showing one of the sections of the roll neck bearing.

While the pins 66 maintain the proper circumferential spacing between the rollers 36, the major ribs 56 of the rib rings 38, to a measure, cooperate in this function in that they prevent the rollers 36 from skewing excessively. The minor ribs 58 crowd the rollers 36 against their respective major ribs 56 during set up and thus assist in the assembly and adjustment of the bearing B. The rib ring 38 for each section 30 provides the minor rib 58 for the preceding or next larger section 30. The minor rib 58 for the smallest section 30 is carried on its own end ring 67 which fits against the back face of the cup 34 for that section 30 (FIG. 3).

The four bearing sections 30 fit in succession over the roll neck 4 (FIG. 3), with the cone 32 of each being seated tightly against the tapered surface 8 of the roll neck 4 so that no radial clearance exists between any one of the cones 32 and the roll neck 4. The back face 44 of the largest cone 32 bears against the fillet ring 16, whereas the back face 44 of each remaining cone 32 abuts the front face 46 of next larger cone 32. The cone thrust ring 18 bears against the front face 46 of the smallest cone 32, and indeed is urged snugly against that cone by the nut 24 of the retaining ring 22. Thus, the four cones 32 are clamped snugly between the fillet ring 16 and the thrust ring 18 and have no free motion in the axial direction. The four cones 32 may be considered a single cone for the bearing B and indeed may be united into a single tapered sleeve having one back face 44 at the fillet ring 16 and one front face 46 and the thrust ring 18. Not only are the rollers 36 of each section 30 on apex, but the several sections 30 share the same apex, which means the cone raceways 42 lie in a single conical envelope, while the cup raceways 48 lie in another conical envelope of slightly steeper angle, but the two conical envelopes have their respective apexes located at a common point along the axis x.

The chock C constitutes a housing for holding the bearing B and transmitting the loads applied to it to the frame D. It includes a block 68 having a cylindrical bore 70 (FIG. 3) which receives the cups 34 of the several bearing sections 30. At the end presented toward the roll body 2, the bore 70 opens out of the block 68, whereas the opposite end of the bore 70 is obstructed by a shoulder 72 against which the end ring 67 for the smallest bearing section 30 fits, that ring being captured between the shoulder 72 and the back face 52 of the cup 34 for the smallest section 30. Here the block 68 is fitted with a seal 74 that bears against the outwardly presented sealing surface on the cone thrust ring 18 to form a fluid barrier which keeps contaminants out of and lubricants within the interior of the bearing B.

The chock C also includes a clamp ring 76 (FIG. 3) which is bolted against the end of the chock C around the unobstructed end of the bore 70. The ring 76 has an annular rib 78 which projects into the bore 70 and bears against the rib ring 38 for the largest of the four bearing sections 30, thus clamping the four cups 34, the four rib rings 38 and the end ring 67 between it and the shoulder 72 so as to eliminate any clearance or axial free motion. The arrangement is such that the back face 52 of the cup 34 for the smallest section 30 is against the end ring 67 which in turn is against the shoulder 72, whereas the back face 52 of the cup 34 for each of the remaining sections 30 bears against the rib ring 38 for the next smaller section 30, forcing those rib rings 38 against the cups 34 with which they cooperate. The front face 54 of cup 34 for the largest bearing section 30 bears against the rib ring 38 for that section, and that rib ring 38 in turn bears against the annular rib 78 on the clamp ring 76. In addition to clamping up the four cups 34, four rib rings 38, and the end ring 67, the clamp ring 76 further carries a seal 80, which contacts the outwardly presented cylindrical surface on the fillet ring 16 to form a fluid barrier which keeps contaminants out of and lubrication within the bearing B.

The block 68 further contains annular lubricant channels 82 (FIGS. 3 & 4) which encircle the three interior rib rings 28, that is, the three rib rings 38 which are captured between cups 34. The two channels 82 closest to the shoulder 72 of the block 68 are connected to a source of pressurized lubricant and, thus, supply lubricant to the interior of the bearing B. The channel 82 closest to the clamp ring 76 represents a return duct and is connected to a lubricant sump. Two common lubrication systems used to propel the lubricant into the bearing are an oil mist system and an oil-air system.

The chocks C at each end of the roll A fit into the frame D somewhat loosely so that if unobstructed, they may be moved upwardly or downwardly in the frame D, but the turndown screws T (FIGS. 1 & 2) or hydraulic pistons block the chocks C and prevent them from rising above a prescribed elevation. The outboard end of the block 68 for each chock C on the operator's side of the frame D may have four cylinders 86 (FIGS. 1-3) arranged symmetrically about the axis x of rotation, with their own axes parallel to that axis, and each cylinder 86 contains a piston 88 which projects axially outwardly beyond the end face of the block 68. Opening into the opposite or inner end of the cylinder 86 is a fluid duct 90 (FIG. 3) which is connected to a source of hydraulic fluid, the pressure of which can be precisely monitored and controlled. The pressurized fluid fills that portion of each cylinder 86 which is not occupied by the piston 88 and exerts an axially directed force on the piston 88. This force exerted by the pistons 88 is resisted by keeper plates 92 (FIGS. 1-3) against which the pistons 88 bear, the plates 92 being fixed firmly to the frame D. As a consequence, the pistons 88, with adequate pressure applied to them, urge the entire chock C toward the body 2 of the roll A, and this causes the tapered raceways 42 and 48 of the bearing sections 30 to seat snugly against the rollers 36 of their respective rows. Indeed, the axial force is transmitted through the roll A to the bearing B at its opposite end and thence into the chock C at that opposite end. That chock bears against keeper plates 92 mounted on the other side of the frame D. In short, the pistons 88 bring the bearings B, which support the roll A, into a condition of preload, and the keeper plates 92 at the two sides of the frame D resist the preload force exerted by the pistons 88. Of course, in this condition no radial clearance exists within those bearings B. The magnitude of the pressure in the cylinders 86 determines the condition of the preload, and that condition remains constant as long as the pressure does not vary, even if the roll A undergoes an axial expansion due to an increase in temperature. Thus, the cylinder 86 and piston 88 serve to compensate for thermal expansion and contraction, keeping the two bearings B for the roll A in the same condition of preload, irrespective of the length of the roll A. This contrasts with conventional roll neck bearings which have their rollers set alternately in the direct and indirect configurations so that preload cannot be adjusted, except perhaps during initial assembly of the bearing at the factory. Ideally, the magnitude of the preload should be proportional to the magnitude of the separating force applied across the roll body 2 to assure that the number of rollers 36 under load in any bearing section 30 remains constant irrespective of the separating force applied to the roll body 2. The cylinders 86 and pistons 88 also accommodate tilting of the chocks C along their respective sides of the frame D, so as to assure more equal distribution of the separating force among the several bearing sections 30.

Figure 1:
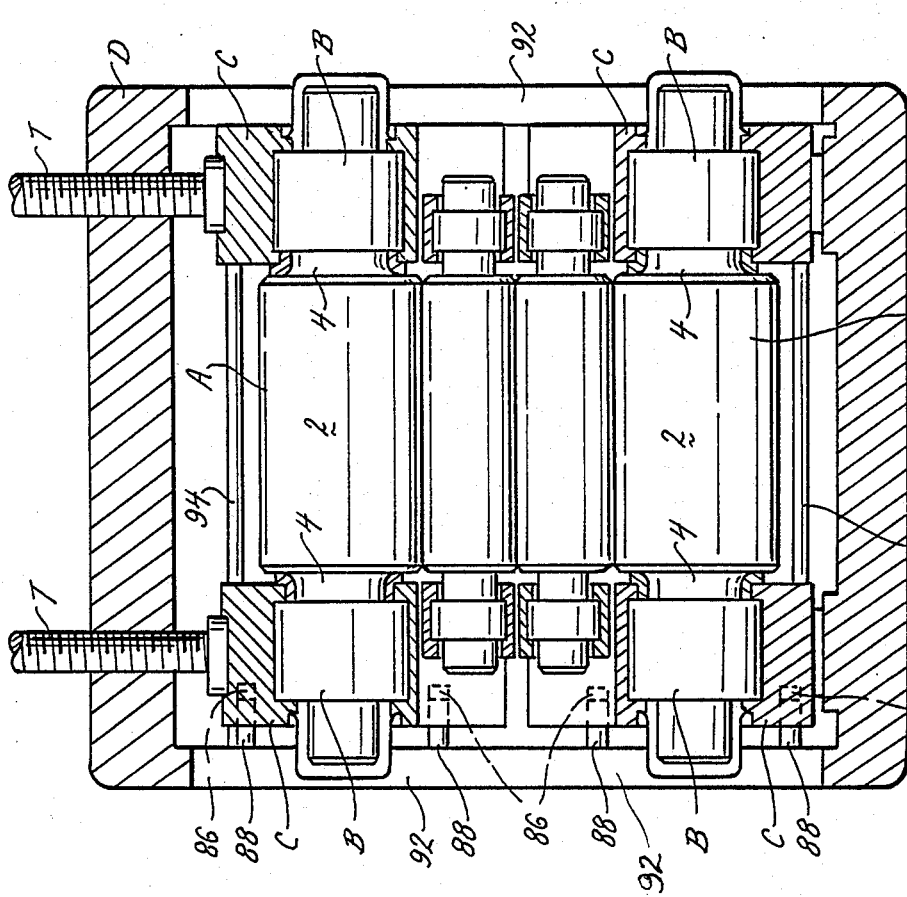
FIG. 1 is a sectional view in elevation of a mill stand having back-up rolls supported on bearings constructed in accordance with and embodying the present invention.

While the cylinders 86 and pistons 88 compensate for thermal expansion and contraction and tilting of the chocks C, they are not effective when the roll A and its bearings B and chocks C are out of the frame D. Indeed, unless restrained the bearing B would come apart. The restraint is provided by tie rods 94 which extend between the two chocks C radially beyond the main body 2 of the roll A (FIGS. 1 & 3). The tie rods 94 themselves may be adjusted to bring the bearings B into a condition of preload so as to facilitate grinding the main body 2 of the roll A when the roll A is out of the frame A.

To assemble the bearings B and chocks C about the roll necks 4 of the roll A so as to have minimal runout at the main body 2 during the operation of the roll A, the roll necks 4 must first be prepared for the bearings B. To this end, the roll A is supported between centers, and the tapered surfaces 8 of its roll necks 4 are ground to the angle and diameter required to accommodate the four cones 32. Once the tapered surfaces 8 are properly ground, the roll A is released from the centers and the fillet rings 16 are pressed onto the fillets 6 of the roll necks 4 (FIG. 3). Then the cones 32 for the four bearing sections 30 of each bearing B are forced over each tapered surface 8 of the roll neck 4 for those bearings. Next, the cone thrust ring 18 is installed over the large cylindrical surface 10 immediately beyond the small end of the tapered surface 8 and beyond it the expandable retaining ring 22 and nut 24 are placed around the smaller cylindrical surface 12 with the nut 24 backed off to a contracted position. The nut 24 is moved up against the thrust ring 18 so the groove 14 is exposed, whereupon the split ring 20 is installed in the groove 14. Once the split ring 20 is secured, the nut 24 is turned on the ring 22 such that the nut 24 and ring 22 expand axially and force the thrust ring 18 against the front face 46 of the smallest cone 32. This clamps all four cones 32 tightly between fillet ring 16 and the cone thrust ring 18, and further causes each to seat snugly on the ground tapered surface 8 of the roll neck 4. The arrangement is such that not one of the four cones 32 can shift axially or radially on the roll neck 4 around which it fits.

Once the cones 32 are fitted securely on their respective roll necks 4 with a proper interference fit, the roll A is again mounted between centers and additional grinds are made on the exterior of those cones to bring the cone raceways 42 to the proper angle and diameter. Thus, the cone raceways 42 are concentric, their centers being the axis x of rotation for the roll A. Moreover, they are flush, that is to say they form in a single conical surface. Indeed, the four cones 32 could just as well be a single cone extending between the fillet ring 16 and the cone thrust ring 18.

Figure 5:
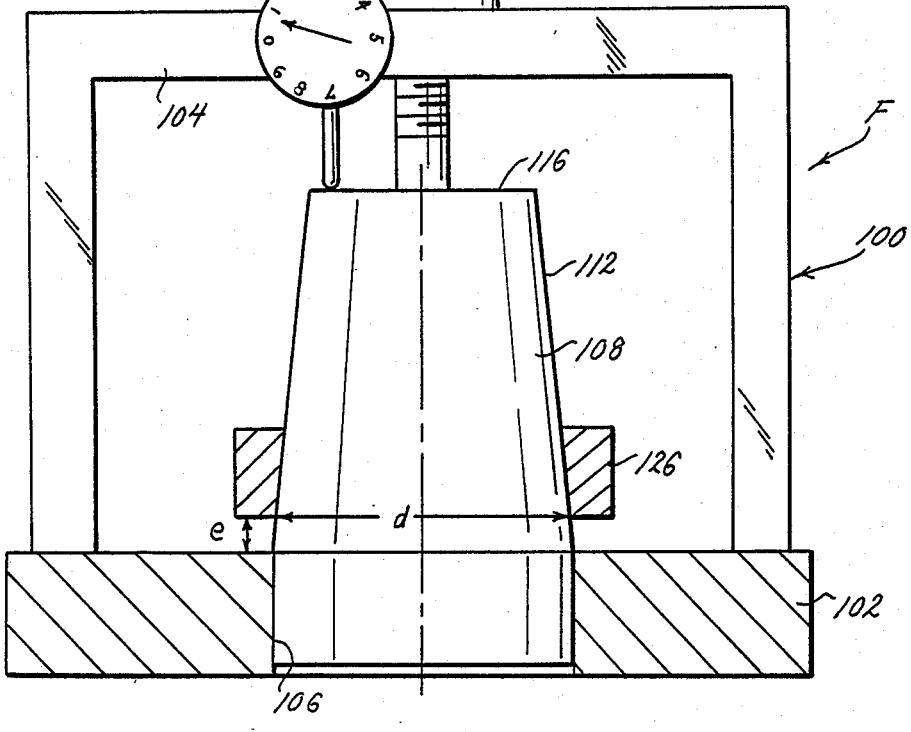
FIGS. 5–7 are elevational views of a fixture used in the assembly of the roll neck bearing, and showing sequentially the steps used for selecting roller sets which will distribute radial loads generally uniformly throughout the several sections of the bearing.
Figure 6:
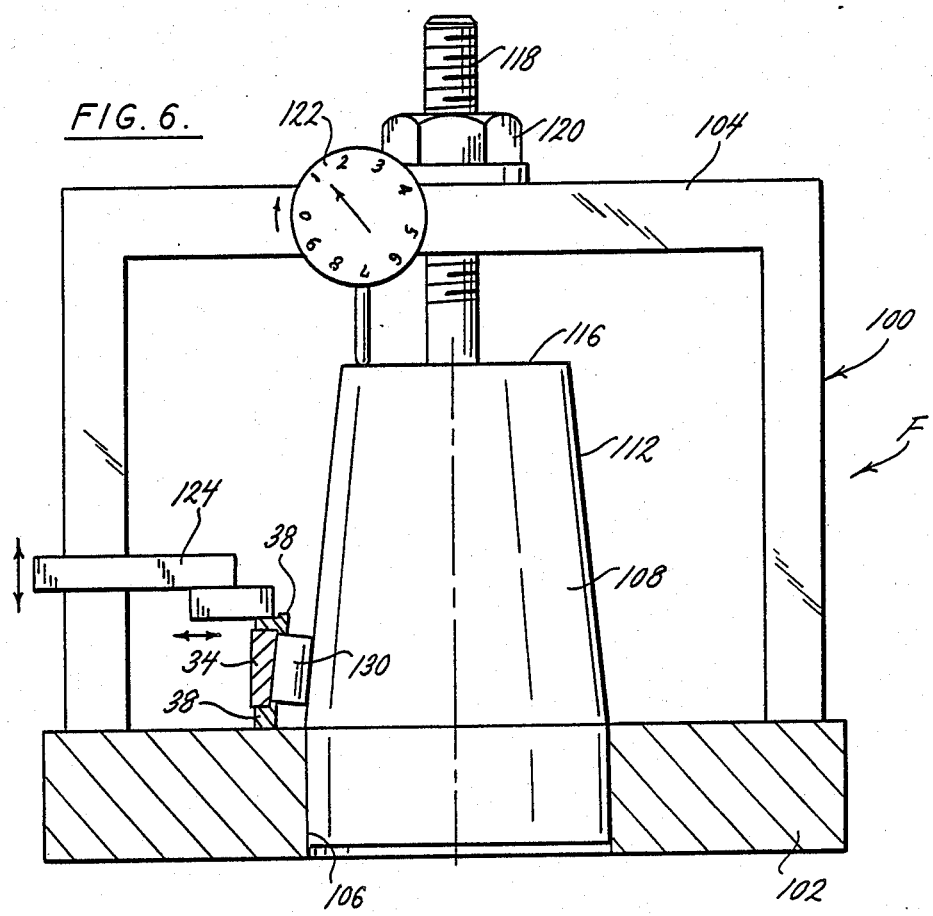
Figure 7:
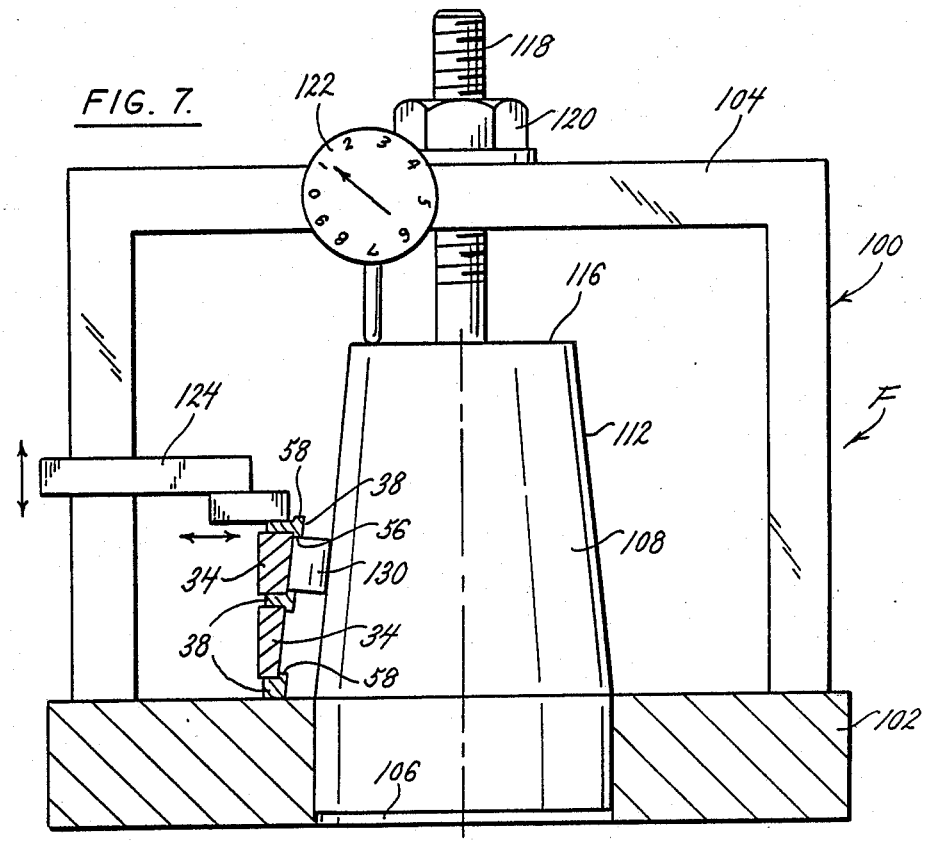

In the manufacture of the bearings B, it is nearly impossible to hold actual dimensions to nominal values. Some deviation occurs. Deviations from nominal dimensions are not very significant, insofar as the raceways 42 of the cones 32 are concerned, as long as their tapers match, or are quite close to, the nominal taper. However, deviations from nominal dimensions in the raceways 48 of the cups 34, and the locations of the radial surfaces on the rib rings 38 have a pronounced effect on the ability of the bearing B to distribute loading evenly between the four sets of rollers 36. As to the rollers 36, after grinding they are measured and segregated such that rollers 36 of like diameter are together—indeed, such rollers 36 of like diameter are assembled into the same production sets. Thus, rollers 36 of one production set may all be larger than the nominal roller diameter, whereas the rollers of another production set may be less than the nominal diameter, but no production set of production rollers should have a great variance in the diameter of its rollers 36. Production sets having rollers 36 of the proper diameter are selected with a set-up fixture F on which the cups 34, rollers 36, and rib rings 38 may be assembled (FIGS. 5–7).

The fixture F includes (FIG. 5) a frame 100 having a base 102 and a bridge 104 located above the base 102. Directly beneath the bridge 104, the base 102 is provided with a cylindrical bore 106. Projecting upwardly out of the bore 106 of the frame base 102 is a dummy cone 108 having a cylindrical lower end 110, which slides freely in the bore 106, and a tapered surface 112, which corresponds in taper and diameter to the ground raceways 42 of the several cones 32. In other words, the tapered surface 112 of the dummy cone 108 corresponds to the conical envelope formed by the ground raceways 42 of the cones 32. In addition, the dummy cone 108 has a flat end face 116 which is squared off with respect to the axis of the cone 108 and a threaded stud 118 which projects upwardly through the bridge 104 on the frame 100 where it is fitted with a nut 120 which is turned down against the bridge 104 to hold the dummy cone 108 in a fixed position with respect to the frame 100.

The bridge 104 of the frame carries a dial indicator 122 which contacts the end face 116 of the dummy cone 108 and senses the distance between that end face and the bridge 104. In a larger sense, the indicator 122 determines the axial position of the tapered surface 112 on the cone 108 with respect to the base 102 of the frame 100.

Finally, the fixture F includes a clamp 124 (FIGS. 6 & 7) which moves upwardly and downwardly on the frame 100, that is, parallel to the axis of the cone 108, yet can be secured in any desired position along that axis.

To assemble the four sets of rollers 36, the four cups 34 and the three rib rings 38, such that radial loading in the bearing B will be distributed generally uniformly between the rollers 36 of the four sets, a ring gage 126 (FIG. 5) is first fitted over the tapered surface 112 of the dummy cone 108, it having an inside taper 128 which corresponds to the taper of the tapered surface 112. The largest diameter on the taper 128, which is, of course, at the lower end face of the ring 126, equals the diameter at which the large diameter end faces for the tapered rollers 36 of a nominal roller set will locate along the raceway 42 of the cone 32 for the first bearing section 30. Assuming that the rollers 36, the cup 34 and the rib ring 38 for the first bearing section 30 are all of nominal dimensions, then the large end faces of the rollers 36 would locate at a diameter d on the cone raceway 42, and that diameter d would equal the work point diameter d on the tapered surface 112 of the dummy cone 108.

The nut 120 is turned to shift the dummy cone 108 and ring gage 126 relative to the frame 100, until the gap between the lower face of the ring gage 126 and the upper face of the base 102 on the frame 102 equals a predetermined dimension e. That dimension corresponds to the axial space e between the back of a nominal end ring 38 and the large ends of a set of nominal rollers 36 on the raceway 42 of the larger cone 32 (FIG.

3). The dial indicator 122 is now adjusted so that it registers zero. The gage ring 126 is removed from the dummy cone 108.

With dummy cone 108 retracted from the bridge 104 of the frame 100, the large rib ring 38 for the bearing B is set upon the base 102 around the bore 106 with its major rib 56 presented upwardly (FIG. 6). Then, a gage set 130 of rollers 36 is placed around the tapered surface 112 of the cone 108 with the large ends of the rollers 36 presented downwardly. Being a gage set, the rollers 36 of the set 130 are as close to nominal dimensions as possible. The large cup 34 for the first bearing section 30 is next placed over the gage set 130 of rollers 36 and the next rib ring 38 is placed against its back face 52. The two end rings 38 with the cup 34 interposed between them are then urged toward the base 106 with the clamp 124. The gage set 130 of rollers 36 remains somewhat loosely between the two rib rings 38.

Next, the dummy cone 108 is raised and simultaneously turned to cause the tapered rollers 36 of the gage set 130 to seat against the tapered surface 112 of the dummy cone 108 and the tapered raceway 48 of the cup 34. The rotation further causes the rollers 36 to migrate along the tapered surface 112 and raceway 48 until their large ends come against the major rib 56 of the first rib ring 38. The reading on the dial indicator 122 is now observed.

If the dial indicator 122 indicates that the dummy cone 108 is above the location which produced a zero reading, then the rollers 36 for the production set used in the first bearing section 30 should be larger than the rollers 36 of the gage set 130 to acquire a reasonably equal distribution of loads between the production sets of rollers 36 of all sections 30 when the bearing B is ultimately assembled. On the other hand, if the dial indicator 122 shows that the dummy cone 108 is low, then the rollers 36 of the production set must be smaller than the rollers 36 of the gage set 130. The object is to select a production set having rollers 36 which will cause the dummy cone 108 to register zero or as near to zero as possible on the dial indicator 122.

A correllation exists between the axial position of the dummy cone 108 and the diameter of the rollers 36 which are against its tapered surface 112, and that, of course, depends on the angle of the taper. For a typical mill roll bearing, a 0.0001 inch change in diameter of its rollers 36 will result in a 0.0024 inch change in the location of the dummy cone 108 along its axis. Of course, the tapered surface 112 of the dummy cone 108 represents the ground raceways 42 of the four cones 32, and what holds true with respect to a production set of rollers 36 on the dummy cone 108, likewise applies to a production set on the raceway 42 of the cone 32 for the first bearing section 30.

The diameter of the rollers 36 for the production set of the first bearing section 30 having been determined, the dummy cone 108 is retracted and the first gage set 130 of rollers 36 is removed. Thereupon, a gage set 130 of rollers 36 for the second section 30 is placed loosely around the tapered surface 112 of the retracted dummy cone 108 and allowed to rest with the large end faces of its rollers 36 against the major rib 56 of the second rib ring 38 (FIG. 7). The cup 34 of the second section 30 is lowered over this set and the third rib ring 38 is placed against the back face 52 of that cup. The two cups 34 and the three rib rings 38 are then held firmly in a stack with the clamp 124, whereupon the dummy cone 108 is again raised and turned to seat the rollers 36 of the second gage set. The dial indicator 122 is observed to determine whether the dummy cone 108 is high or low, and a production set of rollers 36 is selected having a size which will cause the dial indicator 122 to register zero or near zero if it were substituted for the second gage set 130.

The production sets of rollers 36 for the third and fourth bearing sections 30 are selected in a like manner.

Figure 8:
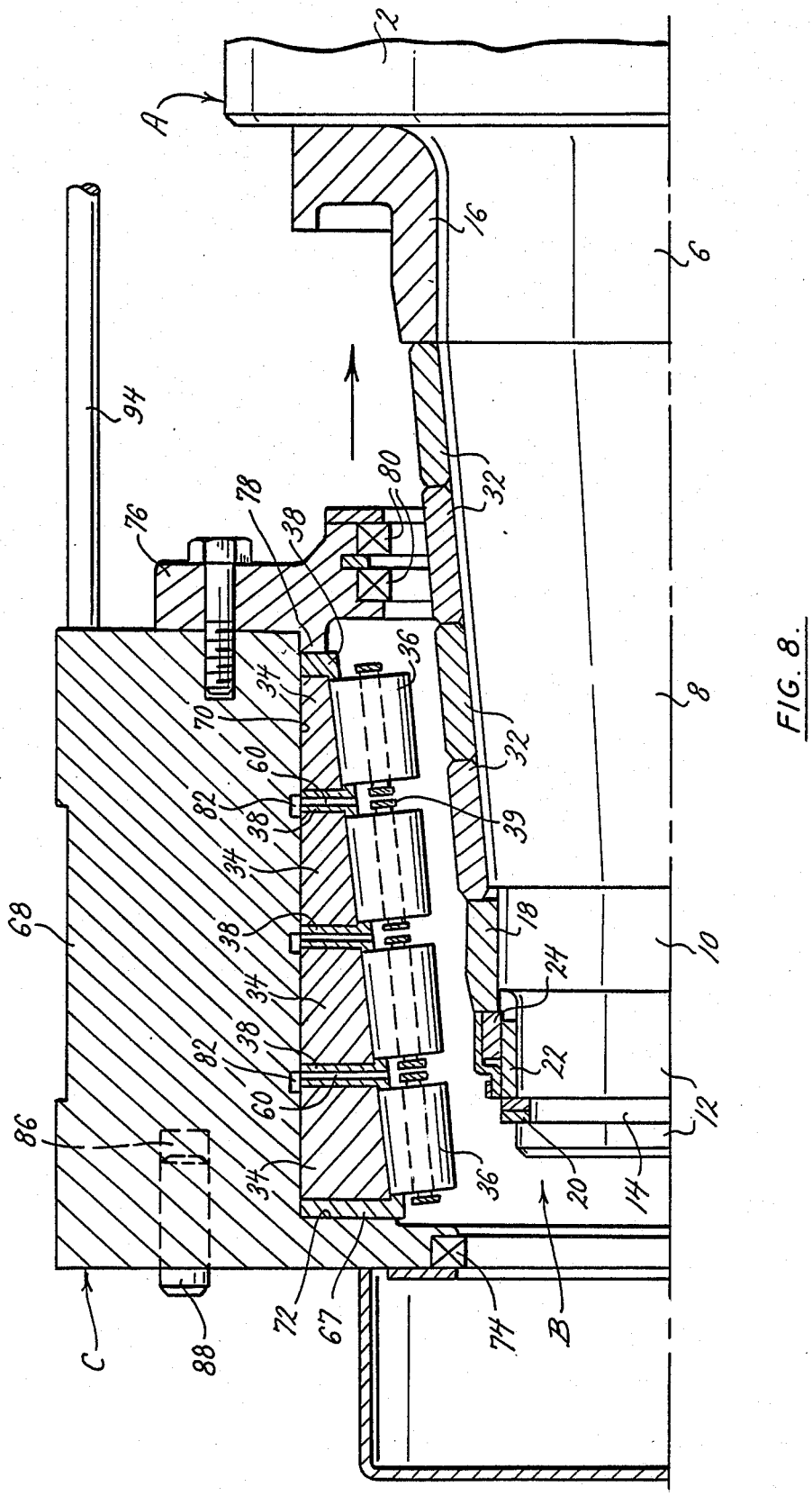
FIG. 8 is a half sectional view showing the chock with the cups and rollers of the bearing passing over the tapered cones during the assembly procedure.

Once the rollers 36, rib rings 38, cups 34, and the end ring 68 are all properly set up on the dummy cone 100, they are fitted to the block 68 of the chock C where a snug fit exists between each cup 34 and the bore 70 of the block. The clamp ring 76 is then installed and its machine bolts tightened so that the rib rings 38, the cups 34, and the end ring 67 are all clamped together between the shoulder 72 and the clamp ring 76. Then the chock C with the cups 34, rollers 36, rib rings 38 and end ring 67, all secured within it as transferred to the roll neck 4, it being fitted over the cones 32 until the rollers 36 seat against their respective cone raceways 42 (FIG. 8).

At this time the roll A along with its chocks 4 is transferred to a roll grinder, and with the chocks C urged axially together to place the bearings B in a condition of preload, the roll A is turned while its roll body 2 is ground. This in-chock grinding eliminates essentially all eccentricity from the roll body 2 so that it turns on the axis x of rotation without runout. Since the several sections 30 of each bearing B are stacked they share the axial force that provides the preload, and thus each section 30 is in a condition of preload.

The bearings B provide the mill roll A and the mill stand 5 with several very significant advantages not accorded by conventional multirow tapered roller bearings or cylindrical roller bearings. Among those advantages are increased stiffness and the near absence of eccentricity. Since the tapered rollers 36 and the raceways 42 and 48 all slope in the same direction, the bearings B are easily preloaded merely by urging their respective chocks C together. The preload eliminates all radial clearances within the bearings B, thus enhancing the stiffness of the mounting. Moreover, any eccentricity derives almost entirely from manufacturing tolerances, but these tolerances are reduced significantly by the machining operations on the tapered surfaces 8 and cone raceways 42 before the bearing B is fully assembled, and by the further machining of the roll body 2 after the bearings B are assembled and preloaded. It is thus possible to eliminate essentially all eccentricity from the roll body 2, except for perhaps the eccentricity that results from the rollers 36, but that source is minimal indeed.

Additional stiffness derives from the direct mounting, that is to say the downward taper toward the outboard ends of the roll necks 4, for the direct mounting reduces the effective bearing spread.

Aside from the stability and stiffness that they afford, the bearings B are easily assembled, and this derives from the flair of the rollers 36 of the several sets, all outwardly toward the open ends of their respective chocks C (FIG. 8). Thus, the chocks C are easily installed over the roll necks 4. In contrast, cylindrical bearings are manufactured with as little clearance as possible, and this makes assembly difficult and occasionally results in damaged rollers or raceways.

Also, where the pistons 88 are utilized for preloading the bearings B, it is possible to control the load zone within the bearings B by varying the pressure of the fluid in the hydraulic cylinders 86. Indeed, the load zone is usually extended over 360° through preloading, while in a cylindrical bearing it cannot exceed 180°. Moreover, the cylinders 86 and their pistons 88 accommodate thermal expansion and contraction of the roll A without changing the condition of preload.

The rollers 36, which are selected for the several rows, provide a convenient means for distributing the radial loads in a desired manner amongst the several rows of rollers 36 if that is desired. For example, the metal which is worked tends to deflect the roll A slightly and thereby impose a greater radial load on the inner rows of rollers 36, that is the rows containing the largest bearing sections 30, but the rollers of the inner rows can be slightly undersized so that those rows take less loading when the roll A runs without deflection. Then, when the deflection occurs, the rollers 36 of the inner rows do not assume any more load than the rollers 36 of the outer rows.

Figure 9:
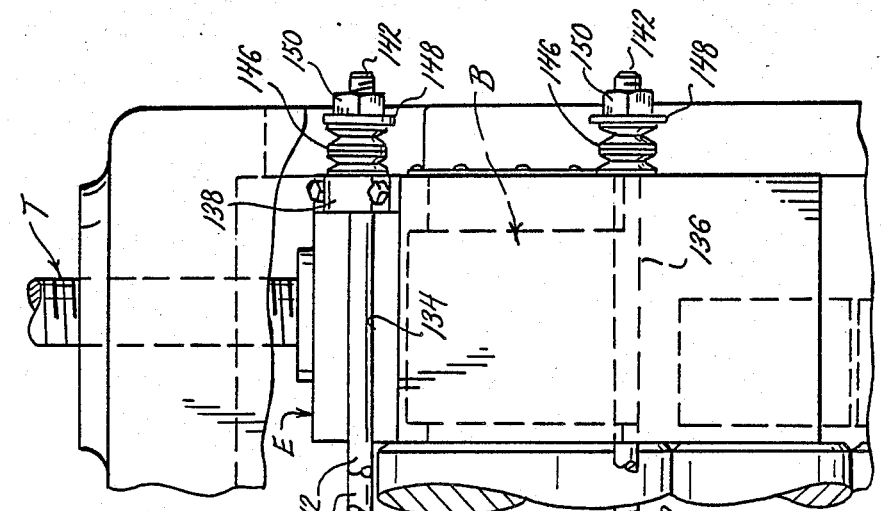
FIG. 9 is a fragmentary elevational view, partially in section, of the mill stand provided with modified chocks.
Figure 10:
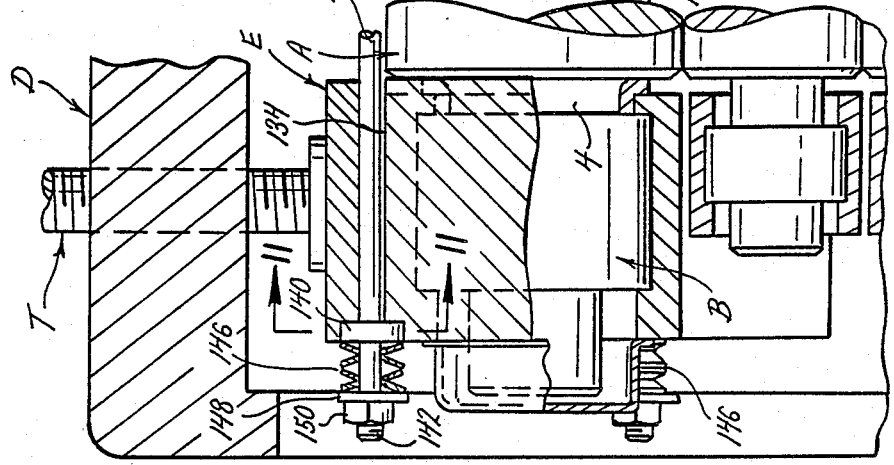
FIG. 10 is a fragmentary end view of the modified mill stand.
Figure 10:
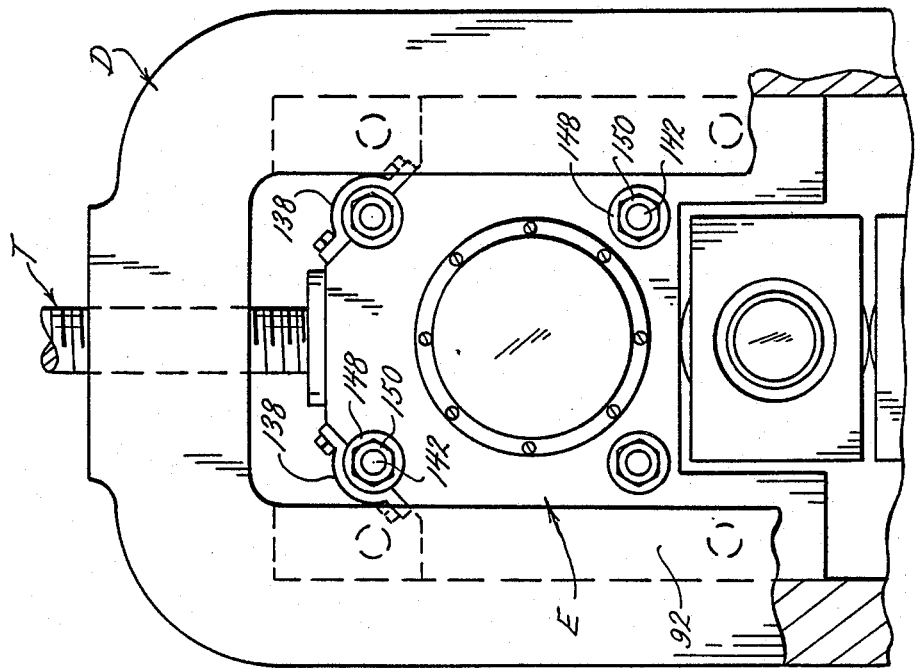
Figure 11:
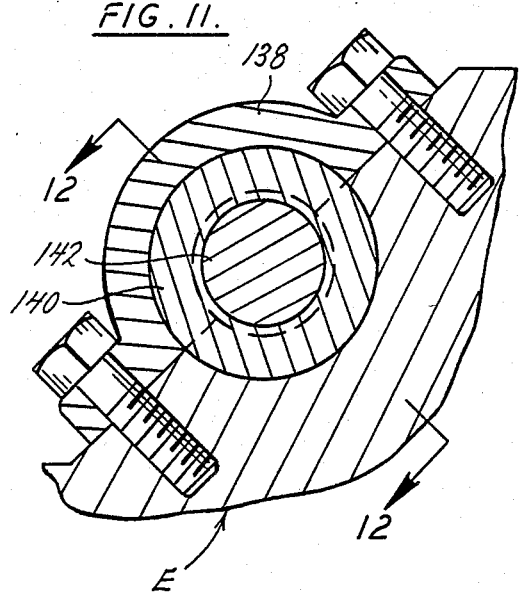
FIG. 11 is an enlarged sectional view taken along line 11—11 of FIG. 9 and showing the channels and caps through which the tie rods extend.
Figure 12:
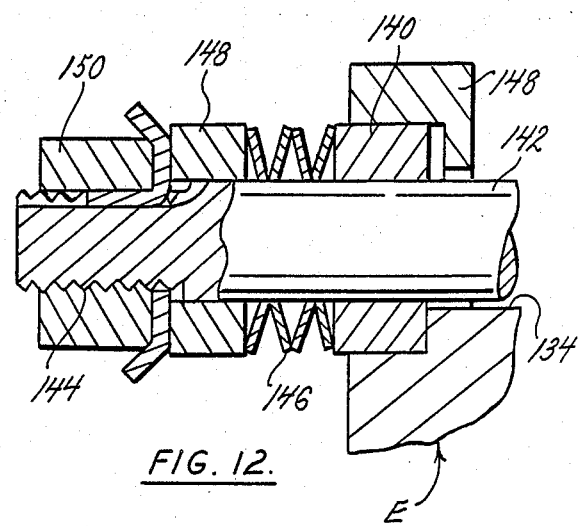
FIG. 12 is a sectional view taken along line 12—12 of FIG. 11.

The mill roll A and its bearing B may be confined by modified chocks E (FIGS. 9 and 10) which are quite similar to the chocks C, except that neither chock E contains hydraulic cylinders 86 or pistons 88 for preloading the bearing B. In lieu of the cylinders 86, the chocks E have through channels 134 and through bores 136, preferably four in number, arranged symmetrically about the axis x of the rotation for the roll A (FIG. 10). The two channels 134 are covered by caps 138 (FIG. 10). Each channel 134 and its cap 138 receives a thrust washer 140 (FIG. 12) and the same holds true for each bore 137. For each channel 134, cap 138 and washer 140 the chock E on the operator side of the frame D, a corresponding channel 136, cap 138 and washer 140 exists in the chock C on the drive side of the frame D, and for each bore 136 on the operator side a corresponding bore 136 exists on the drive side. Extending through the aligned washers 140 in the two chocks E are tie rods 142, and, indeed, the tie rods 142 pass completely through the channels 134 and bores 136 and project beyond the end faces of the chocks E. Here they are provided with threads 144.

Fitted over the outwardly projecting ends of the tie rods 142 are spring packs 146, each consisting of several Belleville springs fitted end-to-end. Each spring pack 146 is captured between the thrust washer 140 of the chock E from which its rod 142 projects and another washer 148 which is held by a nut 150 that is turned down over the threads 144 on the end of the rod 142, thereby compressing the individual springs of the spring pack 146. The nuts 150 of the several rods 142 are adjusted such that the force exerted on the chocks E by the compressed springs of the spring packs 146 induces the desired preload in the bearings B. Coil-type compression springs may be substituted for the Belleville springs of the spring packs 146.

Figure 13:
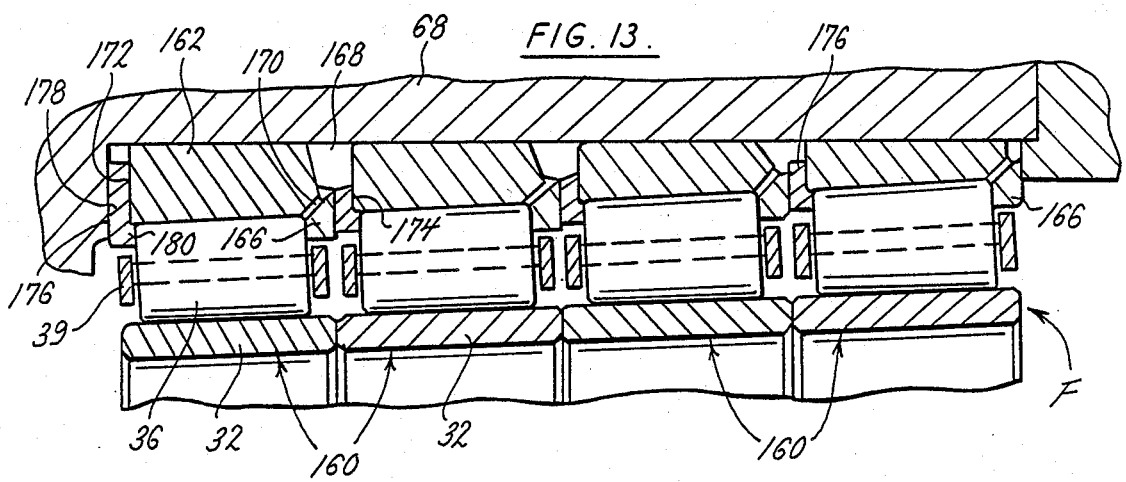
FIG. 13 is a sectional view of a modified bearing.

A modified bearing F (FIG. 13) is quite similar to the bearing B and like the bearing B has cones 32, tapered rollers 36 and cages 39 arranged in four sections 160. However, in lieu of a separately formed cup 34 and rib ring 38, each section 160 of the bearing F has a cup 162 provided with a tapered raceway and a major rib 166 formed integral with the cup 162 at the large end of its raceway. The outside diameter of the rib 166 is less than the outside diameter of the main body for the cup 162 so as to create within the bore 70 of the chock C an offset 168 at the end of the cup 162. In order to deliver oil to the critical inside face of the rib 166, the cup 162 has several oil holes 170 which lead obliquely from the offset 168 to the region where the tapered raceway 164 merges into the rib 166. Each cup 162 has a backface 172 and a front face 174, the latter being on the rib 160.

In addition, each section 160 of the bearing F includes a rib ring 176 having a flange 178 which lies against the back face 172 of its cup 162 and a minor rib 180 which projects slightly into the cup 162 at the small diameter end of its raceway 164. The width of the flange 178 controls the proportion of the load taken by the section 160, and indeed the rib rings 176 are initially machined with their flanges 178 somewhat thicker than required so that they may be ground down to distribute the loads equally between the four sections 160 or otherwise as may be desired.

Figure 14:
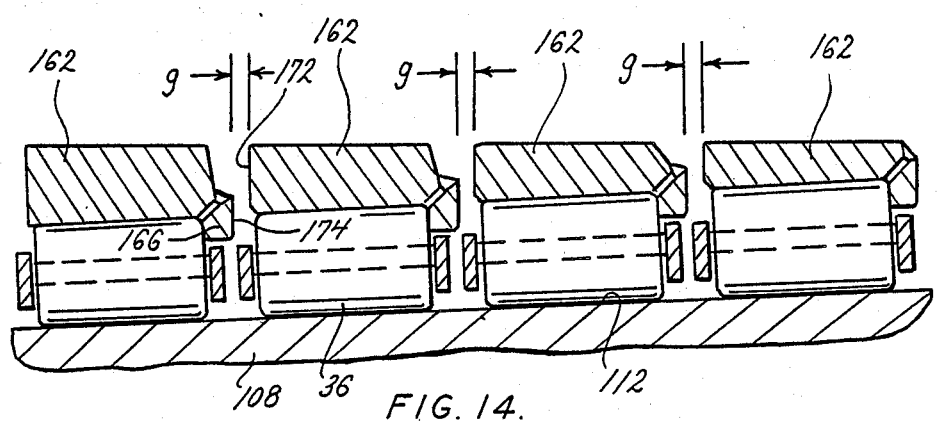
FIG. 14 is a sectional view of the modified bearing, absent its cones and rib rings, fitted around a fixture used to determine the precise sizes to which the rib rings are ground.

To assemble the bearing F, the tapered rollers 36 and the cup 162 for each section 160 are fitted over the dummy cone 108 with the tapered side faces of the rollers 36 being against the tapered surface 112 of the dummy cone 108 (FIG. 14). The cups 162 are oscillated to insure that the rollers 36 within them are oriented correctly with respect to the cup raceways 164 and to further insure that the large end faces of the rollers 36 seat against the integral ribs 166. A dial indicator may be used to verify that each cup 162 is properly aligned, that is to say that it is square with respect to the axis of the dummy cone 108.

Due to the absence of the rib rings 176, three gaps g (FIG. 14) exist between the four cups 162. More specifically, a separate gap g exists between the back face 172 of each cup 162, except the last cup 162, and the front face 174 on the integral rib 166 of the next cup 162. The gaps g represent the space normally occupied by the flanges 178 of rib rings 176 for the bearing F, and of course the flanges 178 must fit their respective gaps g. To this end, the gaps g are measured and the flanges 178 of the rib rings 176, being initially oversized, are ground to match the dimensions of the gaps g.

Thus, when the bearing F is reassembled with the cones 32 and rib ring 176, the bearing sections 160 will share the load substantially equally. Of course, the load may be distributed as desired among the several bearing sections 160 by controlling the thickness of the flanges 172. For example, if one desires to decrease the load taken by a bearing section, the flange 172 at the integral rib 166 for that section is ground slightly thicker than the gap g measured along the dummy cone 108.

While the bearings B or F and the chocks C or E support a mill roll in a mill stand, with minor adaptations, they may be used in other types of rolls, such as calendars for rolling plastics and elastomers. Furthermore, the roll configuration could be extended to include Z-mills, 6-high mills or other mills used for rolling material to a precise thickness.

This invention is intended to cover all changes and modifications of the example of the invention herein chosen for purposes of the disclosure which do not constitute departures from the spirit and scope of the invention.

What is claimed is:

1. A bearing assembly for supporting a shaft having a neck and a body, said bearing assembly comprising: a cone, formed as a single element or multiple elements, fitted over the neck and having outwardly presented tapered raceways, all of which taper downwardly away from the body of the shaft, the cone raceways being progressively greater in size so that each raceway beyond the smallest is at its small end at least as large as the large end of that raceway which precedes it; a plurality of cups encircling the cone and having tapered raceways presented inwardly toward, but spaced outwardly from, the raceways of the cone and being inclined in the same direction as the raceways of the cone, there being a separate cup raceway for each cone raceway; tapered rollers arranged in circumferential rows between the raceways of the cups and cone, such that the rollers along their sides contact the raceways of the cone and cups, there being a separate row of tapered rollers within each cup; a major rib located in a fixed position at the end of each cup and projecting inwardly past the large diameter end of the raceway for the cup to provide a surface against which the large diameter ends of the rollers bear; a housing surrounding and containing the cups; clamp means on the housing for clamping the cups securely together so that they cannot shift relative to each other in the axial direction; and means for exerting an axially directed force on the housing, with the force being directed generally toward the body of the shaft so as to maintain the rollers seated against the raceways of the cone and cups.

2. A bearing assembly according to claim 1 wherein the raceways of the cone lie in a single conical envelope having its apex along the axis of rotation for the bearing assembly; and wherein the raceway of each cup, if extended to its apex, would have that apex located along the axis of rotation substantially at the apex for the conical envelope in which cone raceways lie.

3. A bearing assembly according to claim 1 wherein the bearing assembly is one of two bearing assemblies located at opposite ends of the shaft, with the shaft body being interposed between them; and wherein tie rods connect the housings for the two bearing arrangements to prevent the housings from separating.

4. A bearing assembly according to claim 3 wherein the means for exerting an axially directed force on the housing are springs which are connected to the tie rods.

5. A bearing assembly according to claim 1 wherein the means for exerting an axially directed force on the housing includes a fluid operated cylinder.

6. A bearing assembly according to claim 1 and further comprising seal means beyond the endmost rows of tapered rollers for maintaining a lubricant in the space between the raceways of the cone and cup; and wherein one of the seal means is carried by the clamp means.

7. A bearing assembly according to claim 1 wherein the raceways of the cone are ground after the cone is on the neck of the shaft so that the cone raceways have the axis of rotation for the shaft as their common center.

8. In combination with a mill roll that has a body and roll necks at each end of the body, an improved bearing assembly for supporting the roll in a frame, said bearing assembly comprising: a tapered roller bearing surrounding each roll neck, each tapered roller bearing including a cone, formed as a single element or multiple elements, fitted tightly over the roll neck at which its bearing is located and having raceways which taper downwardly away from the roll body and lie within a single conical envelope that has its apex along the axis of rotation for the body, a plurality of cups surrounding the cone, with each having a tapered raceway that is presented inwardly toward and surrounds a tapered raceway of the cone and further tapers downwardly in the same direction as the taper on the raceways of the cone, tapered rollers arranged in rows between the raceways of the cups and cone and contacting those raceways along their tapered side faces, there being a separate row of rollers between corresponding cone and cup raceways, and a major rib located at the end of each cup and projecting inwardly past the large end of the raceway for the cup to serve as an abutment against which the large ends of the rollers for the cup bear; a chock receiving each tapered roller bearing and including clamp means for clamping the cups of the bearing together so they cannot shift axially with respect to each other; and means for positioning the chocks so that the tapered rollers of the two bearings remain seated against the tapered raceways of their respective cups and cones to thereby eliminate radial clearance within the bearing.

9. The combination according to claim 8 and further comprising a tie rod extending between the chocks to prevent them from separating.

10. The combination according to claim 9 wherein the means for positioning the chock includes a spring which acts against the tie rod and at least one of the chocks.

11. The combination according to claim 8 wherein the means for positioning the chocks comprises at least one fluid operated cylinder and piston at one of the chocks for exerting an axially directed force on the chocks.

12. The combination according to claim 8 and further comprising seals at each end of each bearing for maintaining a lubricant in the space between the raceways of the cone and cups, each seal being carried by the chock for the bearing and one of the seals further being on the clamp means for the bearing.

13. The combination according to claim 8 and further comprising rib rings located between the ends of adjacent cups and serving to position the cups axially with respect to each other.

14. A process for supporting a mill roll having a roll body and roll necks at the end of the roll body, said process comprising: installing a cone of one or multiple elements over each roll neck, with the cone having outwardly presented raceways which taper downwardly away from the roll body; grinding the cone along its raceways while it is on the roll neck so that the raceways have a common center which is coincident with the axial center of the roll neck on which the cone is mounted; installing cups, rollers, and rib rings in housings, with the rollers being arranged in rows within the cups and the rib rings being at the large ends of the rows of rollers, all with the cups and rib rings clamped snugly together; installing the housings, with their cups, rollers, and rib rings, over the roll necks so that the rollers seat against the cone raceways; whereby the cones, rollers, cups, and rib rings about each roll neck form a bearing for the roll neck; supporting the roll on its bearings; and while the roll is supported on its bearings, grinding the roll body so that it has its center along the axis of the bearing.

15. The process according to claim 14 and further comprising maintaining the bearings in a condition of preload while the roll body is ground.

16. The process according to claim 15 wherein the bearings are maintained in a condition of preload by urging the housings for the two roll necks together.

17. The process according to claim 14 wherein the raceways of the cone are flush and lie in a common conical envelope that has its center and apex along the axis of rotation for the bearing.

18. A bearing comprising: a cone formed as a single element or multiple elements and having outwardly presented tapered raceways which taper downwardly, have a common center axis, and lie within the same conical envelope; a plurality of cups encircling the cone and having tapered raceways presented inwardly toward, but spaced outwardly from, the raceways of the cone and being inclined in the same direction as the raceways of the cone, there being a separate cup raceway for each cone raceway; tapered rollers arranged in circumferential rows between the raceways of the cups and cone, such that the rollers along their sides contact the raceways of the cone and cups, there being a separate row of tapered rollers within each cup; a major rib located in a fixed position at the end of each cup and projecting inwardly past the large diameter end of the raceway for the cup to provide a surface against which the large diameter ends of the rollers bear; and rib rings located between the ends of adjacent cups and serving to locate the cups and the rows of rollers axially with respect to each other.

19. A bearing according to claim 18 wherein at least some of the major ribs are on the rib rings.

20. A bearing according to claim 18 wherein the major ribs are formed integral with the cups.

* * * * *